(12) United States Patent
Pierce et al.

(10) Patent No.: US 12,727,715 B2
(45) Date of Patent: Sep. 8, 2026

(54) SYSTEMS FOR LOCATING A SLIDE RAIL ON A STAND MIXER

(71) Applicant: Haier US Appliance Solutions, Inc., Wilmington, DE (US)

(72) Inventors: Andrew Pierce, Louisville, KY (US); Danister Abeygunawardana, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 1070 days.

(21) Appl. No.: 17/881,733

(22) Filed: Aug. 5, 2022

(65) Prior Publication Data

US 2024/0041260 A1 Feb. 8, 2024

(51) Int. Cl.
*A47J 43/044* (2006.01)
*A47J 43/07* (2006.01)

(52) U.S. Cl.
CPC ......... *A47J 43/044* (2013.01); *A47J 43/0705* (2013.01); *A47J 2043/04454* (2013.01)

(58) Field of Classification Search
CPC ....... B01F 35/42; B01F 35/423; A47J 43/044; A47J 43/0705; A40J 2043/04454
See application file for complete search history.

(56) References Cited

U.S. PATENT DOCUMENTS 1,067,845 A * 7/1913 Shattuck ............... A47J 43/044 366/207
2,616,674 A * 11/1952 Polivka ................... B01F 27/13 74/606 R
4,351,612 A * 9/1982 Valbona ................ A47J 43/044 366/206
5,688,030 A * 11/1997 McAnally ............... G06F 1/181 248/500
6,966,690 B2 11/2005 Yen
6,991,363 B2 1/2006 Brunswick et al.
7,438,463 B2 * 10/2008 Schnipke ................. A21C 1/02 366/206
8,066,426 B2 * 11/2011 Sandford .............. A47J 43/046 366/205
8,182,135 B2 5/2012 Blackburn et al.
2004/0208082 A1 * 10/2004 Huang ..................... A21C 1/02 366/206
2005/0002272 A1 * 1/2005 Brunswick .......... B01F 35/7548 366/207
2010/0180431 A1 * 7/2010 Blackburn .......... B01F 35/6052 366/198

FOREIGN PATENT DOCUMENTS

GB 687323 A * 2/1953
JP 4523870 B2 8/2010

* cited by examiner

*Primary Examiner* — Marc C Howell
(74) *Attorney, Agent, or Firm* — Dority & Manning, P.A.

(57) ABSTRACT

A stand mixer appliance includes a casing that includes a base, a column mounted to the base, and a motor housing mounted to the column and extending outwardly above the base. The column includes a slide rail mounted to the column. The slide rail includes a pin configured to engage with an aperture of the column.

16 Claims, 4 Drawing Sheets

SYSTEMS FOR LOCATING A SLIDE RAIL ON A STAND MIXER

FIELD OF THE INVENTION

The present subject matter relates generally to systems for locating a slide rail on a stand mixer.

BACKGROUND OF THE INVENTION

Stand mixers are generally used for performing automated mixing, churning, or kneading involved in food preparation. Typically, stand mixers include a motor configured to provide torque to one or more driveshafts. Users may connect various utensils to the one or more driveshafts, including whisks, beaters, or the like. When using the stand mixer, the contents of the bowl can become heavy and difficult to move or manage. When this occurs, it is beneficial to use a specialized mixer. One type of specialized mixer, for example, is a tilt-head mixer. The tilt-head mixer is a type of stand mixer that allows the user to tilt the head of the mixer to provide access to the opening of the bowl. Tilt-head mixers may be troublesome as the head of the mixer is typically heavy.

Another type of mixer is the bowl-lift mixer. Bowl-lift mixers are stand mixers that incorporate a bowl that can be lifted vertically up a slide rail. Arms extending from the mixer support the bowl, and a lever, or crank, projecting out of one of the sides of the mixer head, may be spun to translate the mixing bowl up or down on the arms. Using a bowl-lift mixer reduces the difficulty of moving the mixing bowl vertically. It is beneficial to have reduced variation in the size of the gap between the slide rail and a column that the slide rail is mounted to in order to appropriately size a flexible seal. Typically, the slide rail is both located and affixed to the main body exclusively with fasteners.

BRIEF DESCRIPTION OF THE INVENTION

Aspects and advantages of the invention will be set forth in part in the following description, or may be apparent from the description, or may be learned through practice of the invention.

In one example embodiment, a stand mixer appliance includes a casing that includes a base, a column mounted to the base, and a motor housing mounted to the column and extending outwardly above the base. The column includes a slide rail mounted to the column. The slide rail includes a pin configured to engage with an aperture of the column.

In another example embodiment, a stand mixer appliance includes a casing that includes a base, a column mounted to the base, and a motor housing mounted to the column and extending outwardly above the base. A first plurality of mounting holes are on the column. A slide rail is mounted to the column. The slide rail includes a second plurality of mounting holes. The column includes an aperture, and the slide rail comprises a pin configured to engage with the aperture of the column. The pin of the slide rail engages with the aperture of the column aligns the first plurality of mounting holes with the second plurality of mounting holes.

In another example embodiment, a stand mixer appliance incudes a casing that includes a lower base portion, a column mounted to the base, and a motor housing mounted to the main body and extending outwardly above the base. A slide rail is mounted to a column of the main body. The slide rail includes a first plurality of mounting holes that are configured to align with a second plurality of mounting holes on the column of the main body. The column defines a plurality of apertures. The slide rail includes a plurality of pins that are configured to engage with the plurality of apertures of the column. The plurality of pins of the slide rail engage with the plurality of apertures of the column in order to align the first plurality of mounting holes with the second plurality of mounting holes.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
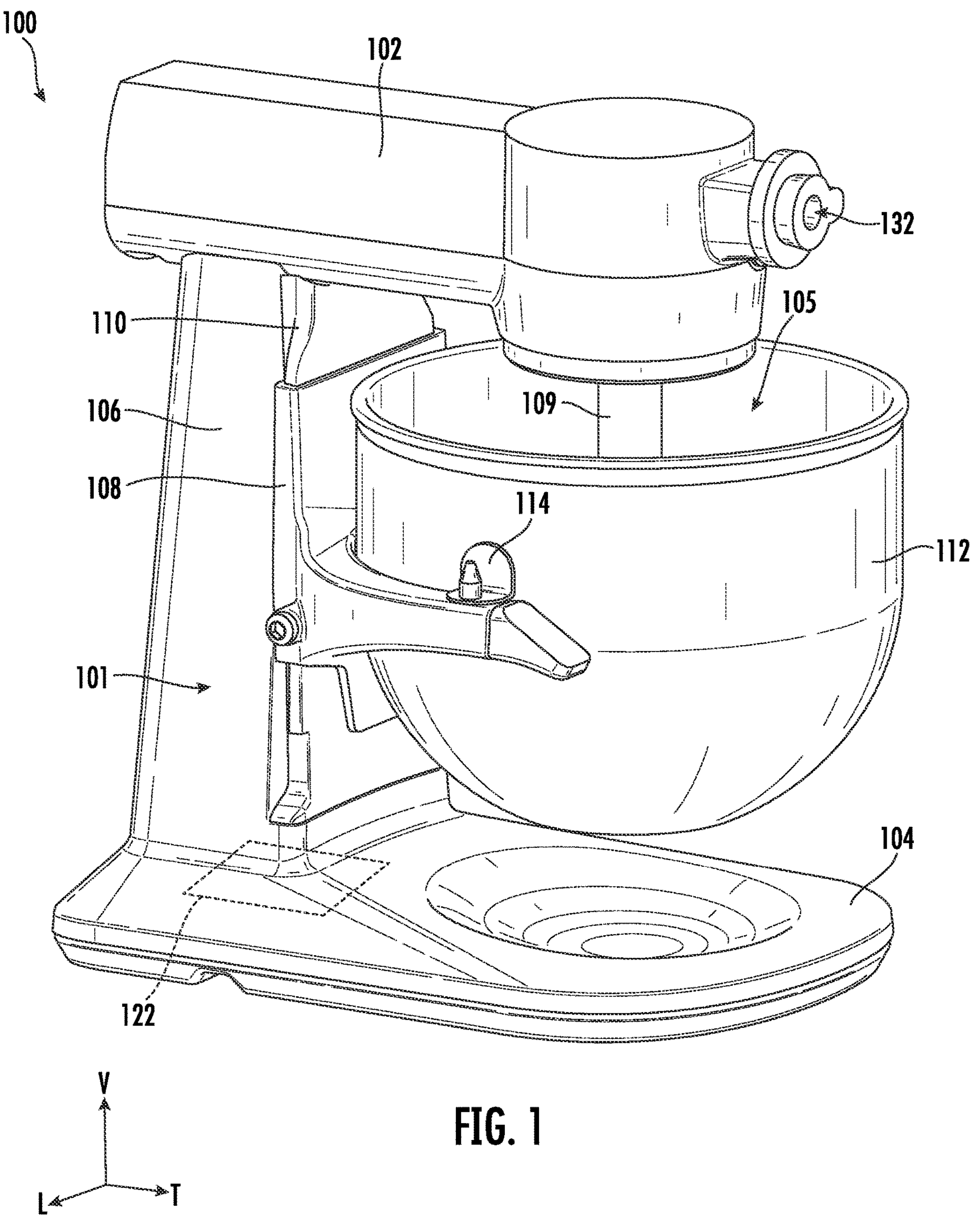
FIG. 1 illustrates an isometric perspective view of an example embodiment of a stand mixer of the present disclosure.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "includes" and "including" are intended to be inclusive in a manner similar to the term "comprising." Similarly, the term "or" is generally intended to be inclusive (i.e., "A or B" is intended to mean "A or B or both"). Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a ten percent (10%) margin.

FIG. 1 provides an isometric view of a stand mixer 100 according to an example embodiment of the present subject matter. It will be understood that stand mixer 100 is provided by way of example only and that the present subject matter may be used in or with any suitable stand mixer in alternative example embodiments. Moreover, with reference to each of FIGS. 1 and 2, stand mixer 100 defines a vertical direction V, a lateral direction L, and a transverse direction T, which are mutually perpendicular and form an orthogonal direction system. It should be understood that these directions are presented for example purposes only, and that relative positions and locations of certain aspects of stand mixer 100 may vary according to specific embodiments, spatial placement, or the like.

Stand mixer 100 may include a casing 101. Casing 101 may include a motor housing 102, a base 104, and a column 106. Motor housing 102 may house various mechanical and/or electrical components of stand mixer 100, which will be described in further detail below. For example, as shown in FIG. 1, a motor 112, a reduction gearbox 114, and a bevel gearbox 116 may be disposed within motor housing 102. Base 104 may support motor housing 102. For example, motor housing 102 may be mounted to base 104 via column 106, e.g., that extends upwardly (e.g., along the vertical direction V) from base 104. Motor housing 102 may be suspended over a mixing zone 105, within which a mixing bowl 112 may be held above base 104.

A drivetrain (not shown) may be provided within motor housing 102 and is configured for coupling a motor to a shaft 109 (e.g., a mixer shaft), such that shaft 109 is rotatable via the motor through the drivetrain, as would be understood in the art. The drivetrain may include a gearbox, and a bevel gearbox, etc. An opening 132 for a horizontal accessory shaft (not shown) may align with the rotational axis of the motor. Mixer shaft 109 may be positioned above mixing zone 105 on motor housing 102, and an attachment, such as a beater, whisk, or hook, may be removably mounted to mixer shaft 109. The attachment may rotate within bowl 112 in mixing zone 105 to beat, whisk, knead, etc. material within the bowl during operation of the motor.

As noted above, the motor may be operable to rotate mixer shaft 109. The motor may be a direct current (DC) motor in certain example embodiments. In alternative example embodiments, the motor may be an alternating current (AC) motor. The motor may include a rotor and a stator. The stator may be mounted within motor housing 102 such that the stator is fixed relative to motor housing 102, and the rotor may be coupled to mixer shaft 109 via the drivetrain. A current through windings within the stator may generate a magnetic field that induces rotation of the rotor, e.g., due to magnets or a magnetic field via coils on the stator. The rotor may rotate at a relatively high rotational velocity and relatively low torque. Thus, the drivetrain may be configured to provide a rotational speed reduction and mechanical advantage between the motor and mixer shaft 109.

Stand mixer 100 may include a controller 122 provided within casing 101. For example, controller 122 may be located within base 104 of casing 101. Controller 122 may be a microcontroller, as would be understood, including one or more processing devices, memory devices, or controllers. Controller 122 may include a plurality of electrical components configured to permit operation of stand mixer 100 and various components therein (e.g., motor 112). For instance, controller 122 may be a printable circuit board (PCB), as would be well known.

As used herein, the terms “control board,” “processing device,” “computing device,” “controller,” or the like may generally refer to any suitable processing device, such as a general or special purpose microprocessor, a microcontroller, an integrated circuit, an application specific integrated circuit (ASIC), a digital signal processor (DSP), a field-programmable gate array (FPGA), a logic device, one or more central processing units (CPUs), a graphics processing units (GPUs), processing units performing other specialized calculations, semiconductor devices, etc. In addition, these “controllers” are not necessarily restricted to a single element but may include any suitable number, type, and configuration of processing devices integrated in any suitable manner to facilitate appliance operation. Alternatively, controller 122 may be constructed without using a microprocessor, e.g., using a combination of discrete analog and/or digital logic circuitry (such as switches, amplifiers, integrators, comparators, flip-flops, AND/OR gates, and the like) to perform control functionality instead of relying upon software.

Controller 122 may include, or be associated with, one or more memory elements or non-transitory computer-readable storage mediums, such as RAM, ROM, EEPROM, EPROM, flash memory devices, magnetic disks, or other suitable memory devices (including combinations thereof). These memory devices may be a separate component from the processor or may be included onboard within the processor. In addition, these memory devices can store information and/or data accessible by the one or more processors, including instructions that can be executed by the one or more processors. It should be appreciated that the instructions can be software written in any suitable programming language or can be implemented in hardware. Additionally, or alternatively, the instructions can be executed logically and/or virtually using separate threads on one or more processors.

Figure 2:
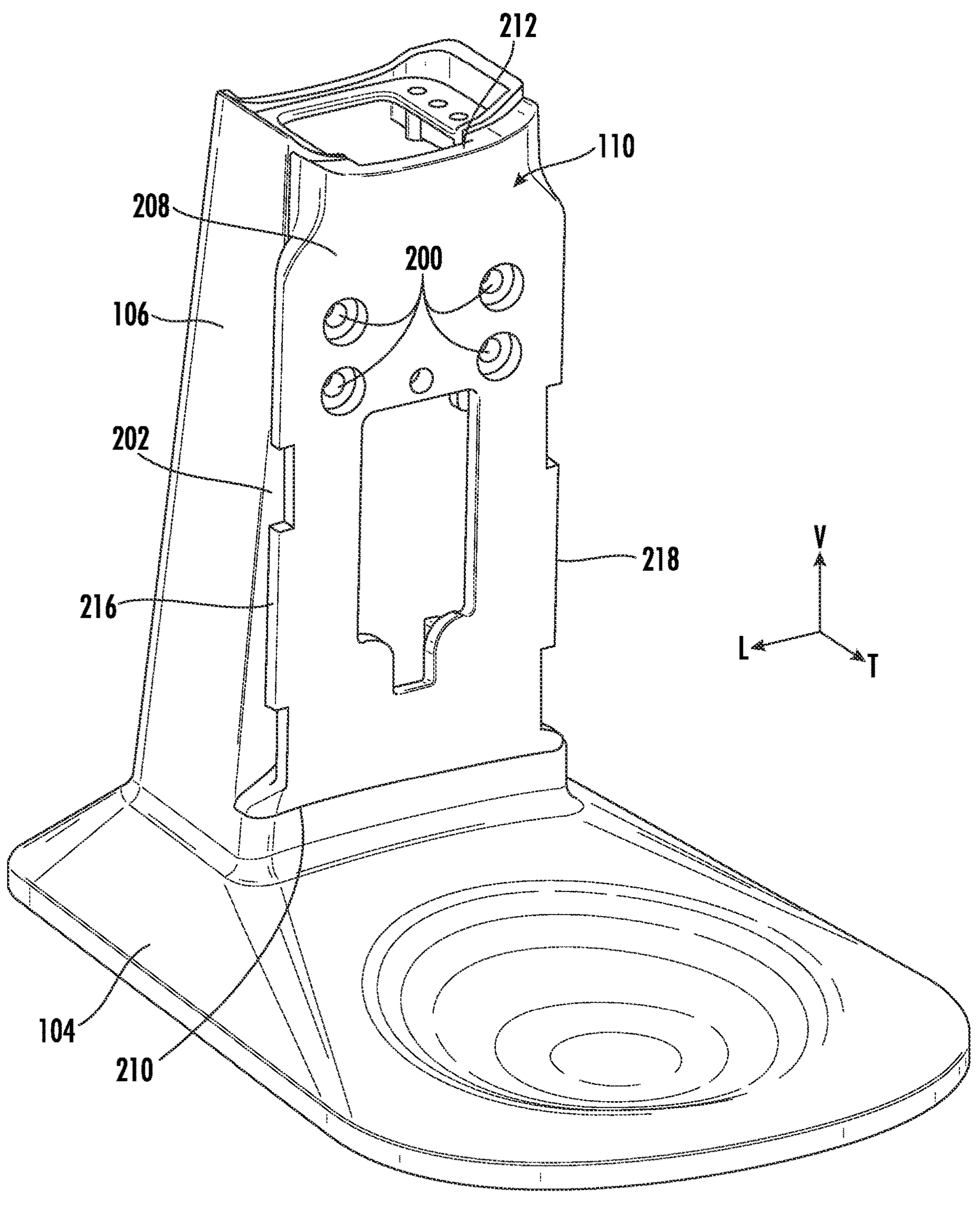
FIG. 2 provides a perspective view of a slide rail mounted to a column of the stand mixer of FIG. 1

Referring now to FIGS. 1 and 2, column 106 may also include a bowl lift framework 108. Bowl lift framework 108 may slidably mount to a slide rail 110, which is mounted to a front face 202 of column 106. Front face 202 of column 106 may be face towards mixing zone 105 with respect to the transverse direction T. Components of bowl lift framework 108 may extend outwardly above the base 104, e.g., in the transverse direction, T, and may hold bowl 112 above, vertically, base 104 in mixing zone 105. Bowl 112 may be removably mounted on bowl lift framework 108 via flanges 114. Flanges 114 may be on opposite sides of the bowl 112 with respect to the circumference of the bowl.

In the operation of stand mixer 100, a user may load food items into bowl 112. The food items may be ingredients, such as flour, water, milk, etc. These items are provided for example purposes only and one skilled in the art would appreciate that there are many more types of food items that may be placed in bowl 112 of stand mixer 100. As may be seen above, after loading the food items into bowl 112, a user turns on a motor to begin the process of mixing, kneading, beating, etc. The motor rotates an attachment attached to stand mixer 100 to complete each of these processes. The processes may be conducted with a respective attachment such as a mixer blade for mixing, a dough hook for kneading, and a balloon whisk for beating.

As may be seen in FIG. 2, slide rail 110 may be mounted to front face 202 of column 106. Slide rail 110 may be extend between a bottom portion 210 and a top portion 212, e.g., along the vertical direction V, and may also extend between a first side portion 216 and a second side portion 218, e.g., along the lateral direction L. Slide rail 110 may be fastened to column 106 through a first plurality of mounting holes 200 by fasteners, such as screws or bolts (not shown). In certain example embodiments, the first plurality of mounting holes 200 may include as few as two (2) and as many as six (6) holes. In the present example embodiment, the first plurality of mounting holes 200 includes four (4) holes. The holes of the first plurality of mounting holes 200 may be spaced in a rectangular pattern proximate top portion 212, first side 216 and second side 218, with two (2) of the holes proximate each side. As shown, the first plurality of mounting holes 200 may have two (2) holes on each side of slide rail 110, oriented one on top of the other with respect to the vertical direction V.

Figures 3, 4:
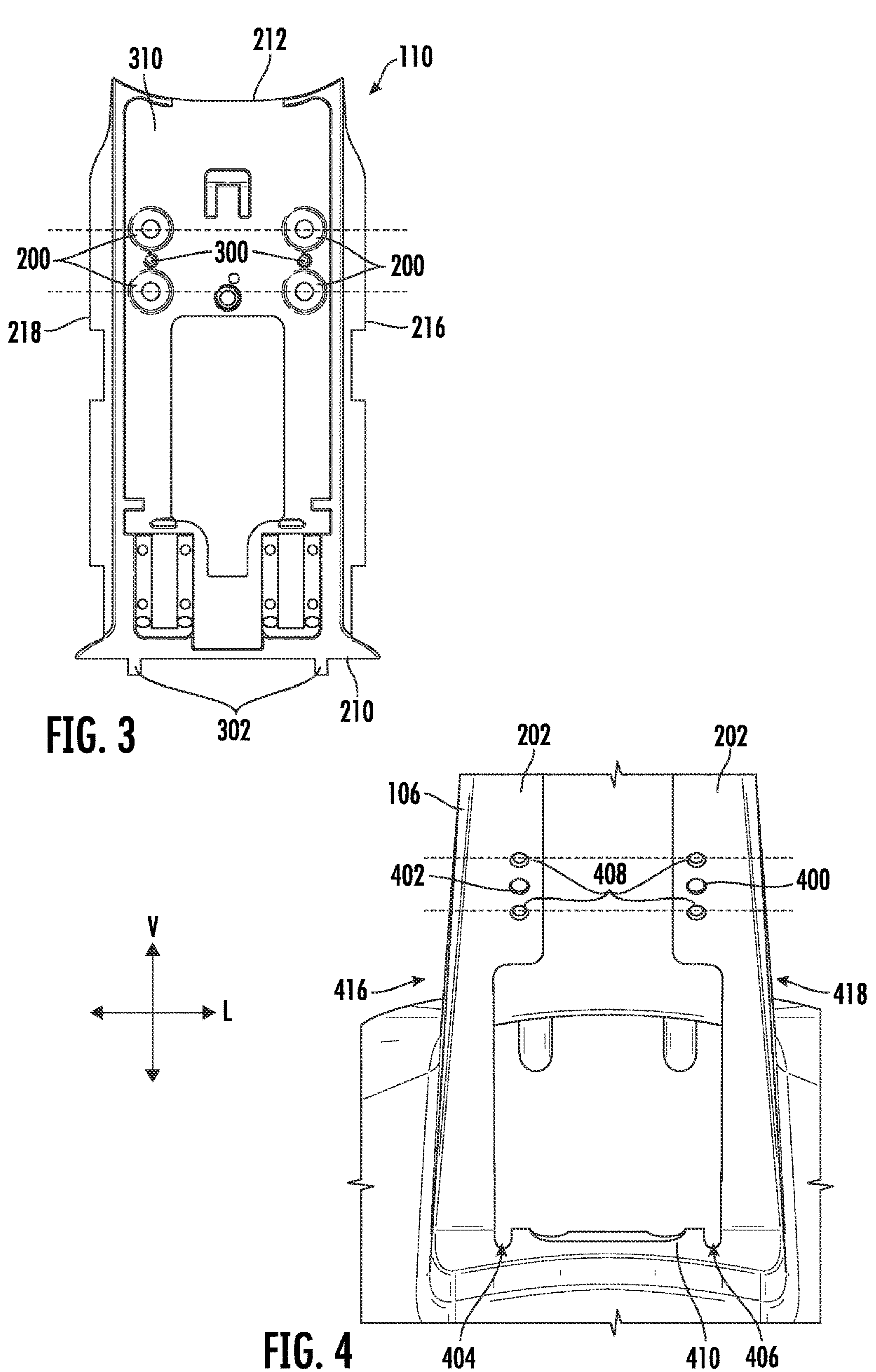
FIG. 3 provides a rear view of the slide rail of the stand mixer of FIG. 1.
FIG. 4 provides an angled front view of the column of the stand mixer of FIG. 1.

Referring now to FIG. 3, at least one pin 300, 302 may be disposed on a back side 310 of slide rail 110, e.g., facing away from mixing zone 105, and may also be disposed on bottom portion 210 of slide rail 110. The at least one pin 300, 302 may include as few as one (1) or as many as six (6) pins. In the present example embodiment, slide rail 110 includes four pins (4), e.g., pins 300 and pins 302. Pins 300 may be disposed on back portion 310 between the first plurality of mounting holes 200 with respect to the vertical direction V. Pins 302 may be disposed on bottom portion 210 and spaced apart with at least one (1) pin proximate first side 216 and one (1) pin proximate second side 218. Pins 302 may be spaced between one centimeter (1 cm) and five centimeters (5 cm) apart with respect to the lateral direction L.

Referring now to FIG. 4, the first plurality of mounting holes 200 of slide rail 110 may align with a second plurality of mounting holes 408 disposed on front face 202 of column 106. Front face 202 may be defined by a bottom portion 410, a first side portion 416, and a second side portion 418. The second plurality of mounting holes 408 may include as few as two (2) and as many as six (6) holes. In the present example embodiment, the second plurality of mounting holes 408 includes four (4) holes. The holes of the second plurality of mounting holes 408 may be spaced in a rectangular pattern proximate first side 416 and second side 418, with two (2) of the holes proximate each side. As shown, the second plurality of mounting holes 408 may have two (2) holes on each side of column 106, oriented one on top of the other with respect to the vertical direction, V.

Referring still to FIG. 4, a plurality of apertures 400, 402, 404, 406 may be disposed on front face 202 and bottom portion 410 of column 106. The plurality of apertures 400, 402, 404, 406 may include as few as one (1) or as many as six (6) apertures. In the present example embodiment, column 106 includes four (4) apertures, e.g., aperture 400, aperture 402, aperture 404, and aperture 406. Aperture 400 and aperture 402 may be disposed on front face 202 between the second plurality of mounting holes 408 with respect to the vertical direction V. Aperture 404 and aperture 406 may be disposed on bottom portion 410 and spaced apart with at least one (1) aperture proximate first side 416 and one (1) aperture proximate second side 418. Aperture 404 and aperture 406 may be spaced between one centimeter (1 cm) and five centimeters (5 cm) apart with respect to the lateral direction, L.

Referring now to FIGS. 3 and 4, aiding the alignment and ease of assembly of slide rail 110 on column 106, pins 300 and pins 302 may be engaged in apertures 400, 402, 404, and 406, as will be explained herein. For example, one of pins 300 may engage in aperture 400, the other pin of pins 300 may engage in aperture 402, one of pins 302 may engage in aperture 404, and the other pin of pins 302 may engage in aperture 406. Pins 300 and pins 302 on slide rail 110 act as four-way (4-way) and two-way (2-way) locators when engaged in apertures 400, 402, 404, and 406. A four-way locator may constrain translation in two (2) directions in the same plane, and a two-way locator may constrain rotation in a plane, e.g., the vertical plane perpendicular to the transverse direction T, thus restraining both rotation and translation. Two (2) of the plurality of apertures, e.g., aperture 402 and aperture 406, may be sized to have clearance fit around pins 300 and pins 302 for locating the other two (2) pin 300 and pin 302 properly in aperture 400 and aperture 404, respectively. Additionally, aperture 402 and aperture 406 may maintain part symmetry and ease of assembly for an operator. The clearance fit apertures may be any of the plurality of apertures so long as the clearance fit apertures are opposite sides of column 106, e.g., such that at least one (1) aperture is proximate first side 416 and one (1) aperture is proximate second side 418, and different heights relative to the vertical direction V, e.g., on front face 202 or on bottom portion 410. Pins 300 and pins 302 engaging with apertures 400, 402, 404, and 406 may permit tighter dimensional control of the two (2) components, namely column 106 and slide rail 110, rather than using a pattern of screw holes as the locating features.

Figure 5:
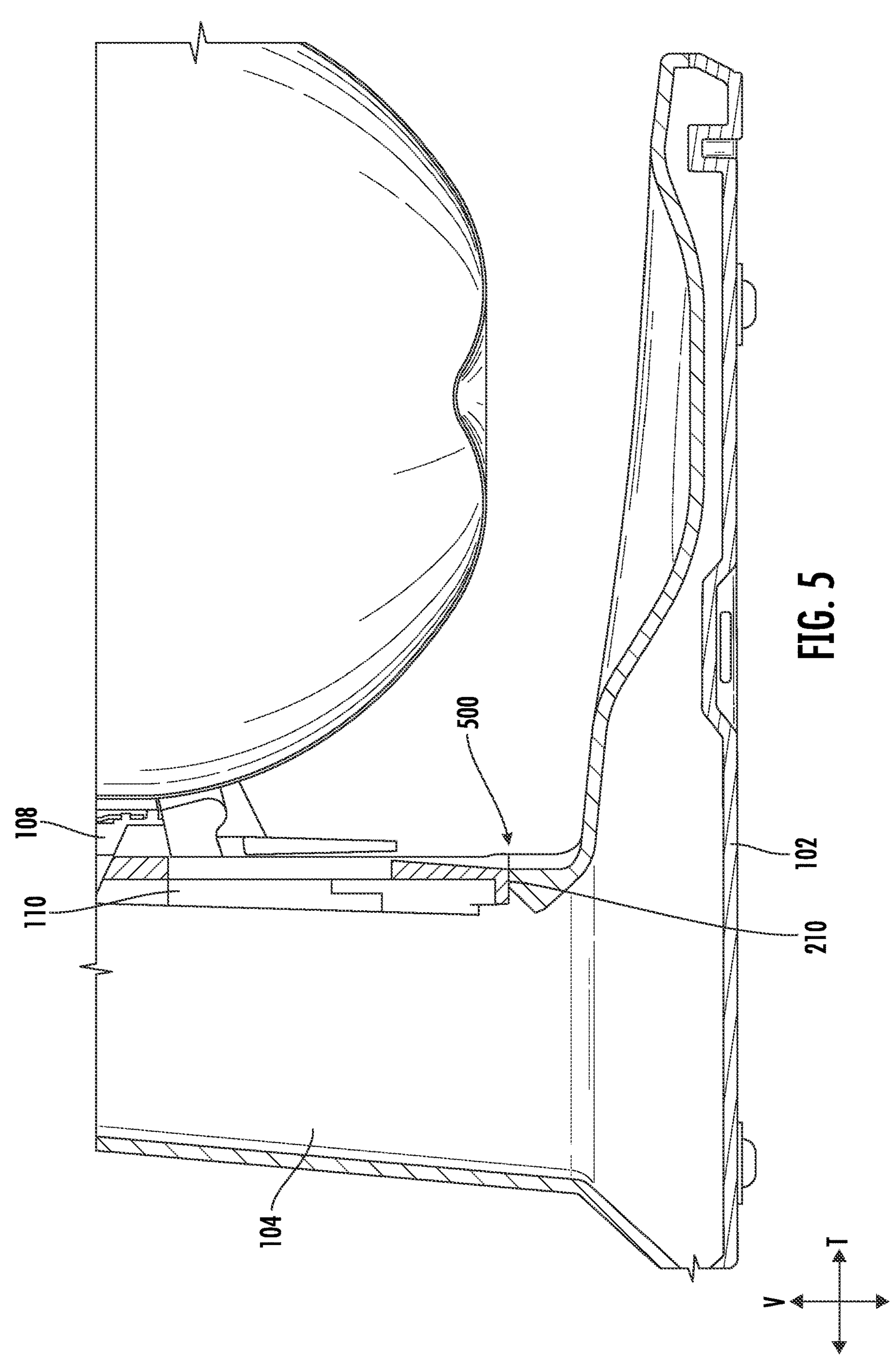
FIG. 5 provides a side view of the stand mixer of FIG. 1.

FIG. 5 illustrates a side view of stand mixer 100. The mounting of slide rail 110 to column 106 defines a gap 500 between bottom portion 410 of column 106 and bottom portion 210 of slide rail 110, e.g., along the vertical direction V. The proper alignment of gap 500 ensures that a uniform gap and flush contact is held around the perimeter of stand mixer 100. Thus, fasteners may properly engage through the first plurality of mounting holes 200 and the second plurality of mounting holes 408, and gap 500 may be uniformly maintained. The uniform gap 500 may permit the installation of additional components, such as seals, to prevent water leakage. As such, pins 300 and pins 302 engaging with apertures 400, 402, 404, and 406 may ensure that column 106 and slide rail 110 couple together in a consistent way each time.

As may be seen from the above, stand mixer 100 with slide rail 110 includes pins 300 and pins 302 that engage apertures 400, 402, 404, and 406 of column 106. The engagement of pins 300 and pins 302 in apertures 400, 402, 404, and 406 may align the first plurality of mounting holes 200 with the second plurality of mounting holes 408 such that gap 500 may have reduced variation and/or is uniform. Thus, with slide rail 110 properly aligned with respect to column 106, the moving components, such as bowl carrier framework 108, may traverse the intended path of travel, both for function and the overall quality appearance of the mixer.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A stand mixer appliance defining a vertical direction, a lateral direction, and a transverse direction, the vertical, lateral, and transverse directions mutually perpendicular, the stand mixer appliance, comprising:

a casing that comprises a base, a column mounted to the base, and a motor housing mounted to the column and extending outwardly above the base, wherein the column comprises a slide rail mounted to the column, the slide rail comprising each of a first pin configured to engage with a first aperture defined in a front face of the column, and a second pin configured to engage a second aperture at a bottom portion of the column, wherein the first pin extends in the transverse direction away from the slide rail and the second pin extends in the vertical direction away from the slide rail, whereby the first pin and the second pin of the slide rail restrains rotation and translation in a vertical plane of the slide rail relative to the column.

2. The stand mixer of claim 1, wherein the first and second apertures of the column are part of a plurality of apertures.

3. The stand mixer of claim 2, wherein the first and second pins on the slide rail are part of a plurality of pins configured to engage with the plurality of apertures of the column.

4. The stand mixer of claim 3, wherein at least one of the plurality of apertures is vertically oriented to restrain rotation in the vertical plane.

5. The stand mixer of claim 1, further comprising a first plurality of mounting holes on the column and a second plurality of mounting holes on the slide rail.

6. The stand mixer of claim 5, wherein the pin of the slide rail engaging with the aperture of the column aligns the first plurality of mounting holes with the second plurality of mounting holes.

7. The stand mixer of claim 1, further comprising a bowl lift framework configured to translate along the slide rail.

8. A stand mixer appliance defining a vertical direction, a lateral direction, and a transverse direction, the vertical, lateral, and transverse directions mutually perpendicular, the stand mixer appliance, comprising:

a casing that comprises a lower base portion, a main body mounted to the lower base portion, and a motor housing mounted to the main body and extending outwardly above the lower base portion; and a slide rail mounted to a column of the main body, the slide rail comprising a first plurality of mounting holes configured to align with a second plurality of mounting holes on the column of the main body, the slide rail comprising each of a first pin configured to engage with a first aperture defined in a front face of the column, and a second pin configured to engage a second aperture at a bottom portion of the column;

wherein the first pin extends in the transverse direction away from the slide rail and the second pin extends in the vertical direction away from the slide rail, whereby the first pin and the second pin of the slide rail restrains rotation and translation in a vertical plane of the slide rail relative to the column, whereby the first pin and the second pin of the slide rail engages with the first aperture and the second aperture, respectively, of the column to align the first plurality of mounting holes with the second plurality of mounting holes.

9. The stand mixer of claim 8, wherein the first and second apertures of the column are part of a plurality of apertures.

10. The stand mixer of claim 9, wherein the first and second pins on the slide rail are part of a plurality of pins configured to engage with the plurality of apertures of the column.

11. The stand mixer of claim 10, wherein at least one of the plurality of apertures is vertically oriented to restrain rotation in the vertical plane.

12. The stand mixer of claim 8, further comprising a bowl lift framework configured to translate along the slide rail.

13. A stand mixer appliance defining a vertical direction, a lateral direction, and a transverse direction, the vertical, lateral, and transverse directions mutually perpendicular, the stand mixer appliance, comprising:

a casing that comprises a lower base portion, a column mounted to the lower base portion, and a motor housing mounted to the main body and extending outwardly above the lower base portion, the column defining a plurality of apertures; and a slide rail mounted to a column of the main body, the slide rail comprising a first plurality of mounting holes configured to align with a second plurality of mounting holes on the column of the main body, the slide rail comprising a plurality of pins, the plurality of pins comprising each of a first pin and a second pin, wherein the first pin is configured to engage with a first aperture of the plurality of apertures defined in a front face of the column, and wherein the second pin is configured to engage a second aperture of the plurality of apertures at a bottom portion of the column;

wherein the first pin extends in the transverse direction away from the slide rail and the second pin extends in the vertical direction away from the slide rail, whereby the first pin and the second pin of the slide rail restrains rotation and translation in a vertical plane of the slide rail relative to the column. and wherein the plurality of pins of the slide rail engages with the plurality of apertures of the column to align the first plurality of mounting holes with the second plurality of mounting holes.

14. The stand mixer of claim 13, wherein at least one of the plurality of apertures is vertically oriented to restrain rotation in the plane.

15. The stand mixer of claim 13, wherein the plurality of pins of the slide rail engaging in the plurality of apertures of the lower base portion restrains rotation and translation in a plane of the main body relative to the lower base portion.

16. The stand mixer of claim 13, further comprising a bowl lift framework configured to translate along the slide rail.

* * * * *